Patented Aug. 14, 1928.

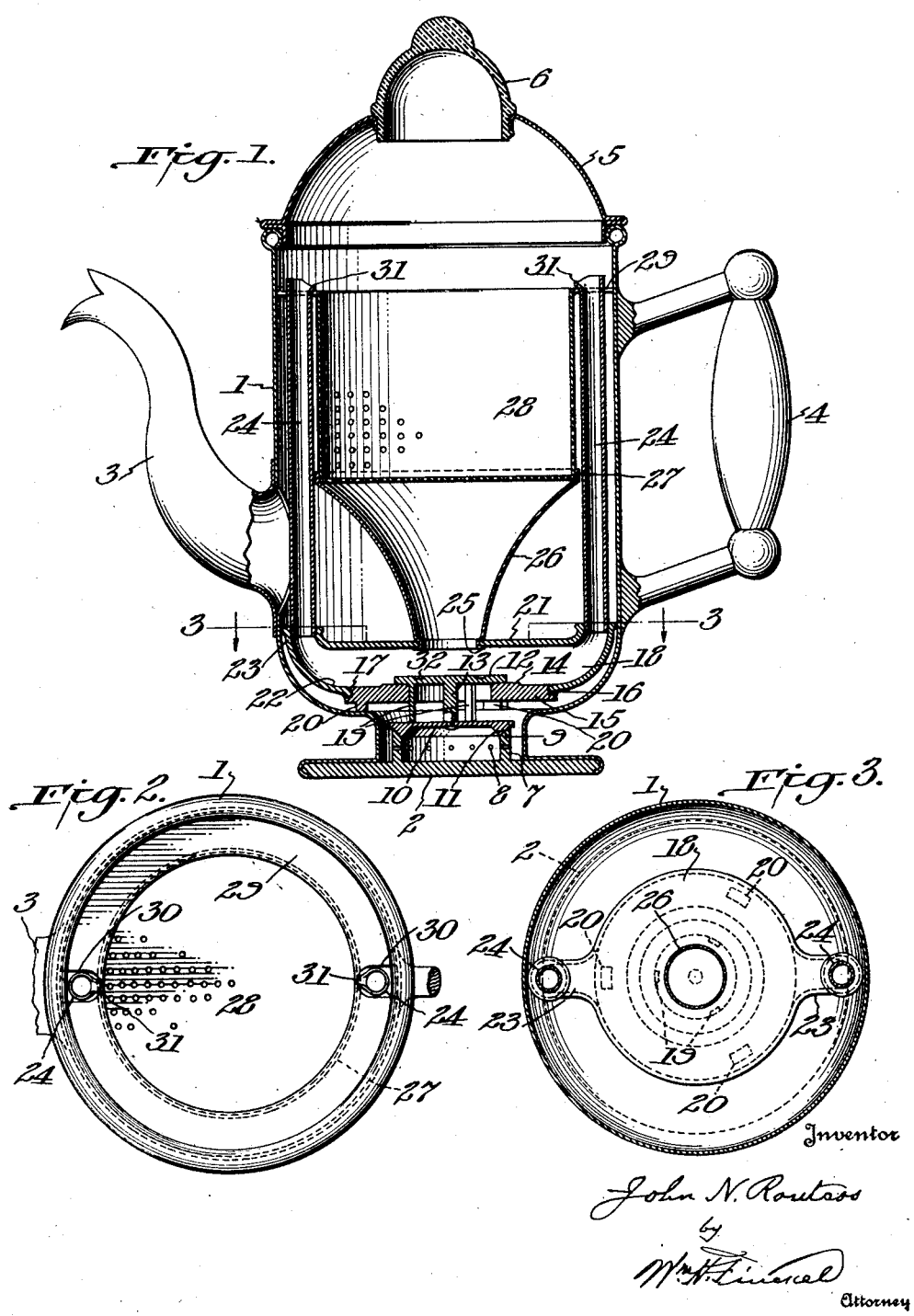

1,680,571

UNITED STATES PATENT OFFICE.

JOHN N. ROUTSOS, OF ATLANTA, GEORGIA.

PERCOLATOR.

Application filed July 9, 1927. Serial No. 204,587.

The object of this invention is to provide an efficient percolating mechanism for use more particularly in coffee pots, for making potable coffee.

The invention consists of a steam-actuated valve immersed in water and by the steam pressure beneath it serving to force the water by impulses from a pressure chamber upwardly through pipes into the ground coffee grains held in a strainer, as I will proceed now more fully to explain and finally claim.

In the accompanying drawings illustrating the invention, in the several figures of which like parts are similarly designated, Figure 1 is a vertical section of a coffee pot containing the percolating elements. Fig. 2 is a top plan view with the cover removed and the spout and handle broken away. Fig. 3 is a cross-section on line 3—3 of Fig. 1.

The coffee pot may consist of a body 1 having a base 2, spout 3, handle 4, cover 5 and inserted glass top 6, all of any desired or approved shape and construction.

Rising from the base 2 is a circular wall 7 having the perforations 8, and constituting a steam generating chamber. The upper edge of this wall is beveled or otherwise constructed to form a valve seat 9.

The valve comprises a disk 10 complementally beveled or otherwise constructed at 11, to fit the valve seat 9, and another parallel disk 12 rigidly connected with and elevated above disk 10 by a stem 13. The disk 12 cooperates with a seat 14 on an annular plate 15, the rim of which has an inset screw-threaded portion 16 which is threaded in a hole 17 in a pressure chamber 18. The disk 12 has depending legs 19 extending through the annular plate and resting on the top of the lower disk 10, so as to insure rigidity of the valve members and guide them in their pulsations. The annular plate has the lugs 20 by which it may be screwed and unscrewed relatively to the chamber 18.

The pressure chamber 18 is of the contour, peripherally, of the interior of the body, and may be made as a hollow casting, having top and bottom walls 21 and 22, in the latter of which is the hole 17 to receive the annular plate 15. The top wall 21 has two or more nipples 23 rising from it, into which are screwed or otherwise fitted, the upstanding pipes 24 which extend toward the top of the body 1.

In the top wall 21 is secured the open bottom 25 of an imperforate funnel 26, the upper and larger end of which is provided with an upstanding flange 27 within which rests the bottom of the perforated strainer 28. This strainer has a laterally extending flange 29, having the notches 30 for the passage of the pipes 24 above it, and these pipes are there provided with the inwardly inclined lips 31 so as to discharge the liquid passing up through the pipes into the strainer, to permit it to percolate through the ground coffee in the strainer into the funnel 26, and thence into the chamber 18 and so on back and forth as often as desired, the liquid escaping from the chamber 18 through the opening in plate 15.

When the valve rises, its top disk 12 having the annular groove 32, seats against the bottom of the funnel and closes said funnel against discharge of its contained liquid until said disk 12 and the lower disk 10 drop away to close the openings in the lower part of the chamber 18 and the steam chamber, respectively. When sufficient steam pressure generates in the steam chamber, the disks are unseated from the steam chamber and the bottom of the chamber 18 and the funnel end 25 is closed, and the liquid enters the chamber 18 and is forced through the pipes 24 into the strainer. These reactions being repeated so long as the liquid in the coffee pot is exposed to steam-generating heat.

By the described mechanism and its mode of operation, the coffee essence is rapidly extracted without spoiling its aroma, and without releasing the objectionable elements in the coffee grains.

Because the valve controls the opening and closing of three openings or ports, it is herein referred to as a triple valve.

The parts are readily assembled and easily inserted in and removed from the pot, and may be detached for cleaning purposes.

Variations in the details of construction and arrangement of parts are permissible within the principle of the invention and the scope of the claims following.

What I claim is:—

1. A percolator, comprising a foraminous strainer, a pressure chamber, tubular members connecting the strainer at top and bottom, a steam generating chamber arranged below the pressure chamber, and a triple valve interposed between the pressure chamber, the steam generating chamber and the bottom connection between the strainer and pressure chamber to control the flow of liquid through the percolator.

2. A percolator, comprising a foraminous strainer, a pressure chamber, tubular members connecting the strainer at top and bottom, a steam generating chamber arranged below the pressure chamber, and a triple valve having spaced apart valve disks, one of which cooperates with ports in the pressure chamber and the bottom connection of the strainer with the pressure chamber and the other opens and closes ports in the steam generator and the pressure chamber to effect the circulation of liquid through the percolator.

3. In a percolator, a steam generator, a valve seat thereon, a pressure responsive valve on said seat, a pressure chamber arranged above said valve, a removable valve seat in said pressure chamber and a valve interposed between the steam generator and the pressure chamber in cooperative connection with said pressure responsive valve and held in place in said removable seat.

4. In a percolator, a strainer, a pressure chamber, an imperforate funnel connecting the strainer and pressure chamber and having an end opening into the pressure chamber, pipes leading from the pressure chamber to the top of the strainer, a valve port in the bottom of the pressure chamber, a steam generator, and a triple valve for opening and closing the pressure chamber, the funnel and the steam generator.

5. In a percolator, a strainer, a pressure chamber, an imperforate funnel connecting the strainer and pressure chamber and having an end opening into the pressure chamber, pipes leading from the pressure chamber to the top of the strainer, a valve port in the bottom of the pressure chamber, a steam generator, and a triple valve having a pair of parallel disks rigidly connected and spaced apart, the upper disk adapted to open and close the open end of the funnel and the bottom of the pressure chamber, and the lower disk adapted to open and close the steam generator.

In testimony whereof I have hereunto set my hand this 6th day of July A. D. 1927.

JOHN N. ROUTSOS.